United States Patent [19]

Sondergeld et al.

[11] Patent Number: 5,013,909
[45] Date of Patent: May 7, 1991

[54] OPTO-ELECTRICAL ACCELERATION SENSOR HAVING A MECHANICAL TILTING ELEMENT

[75] Inventors: Manfred Sondergeld; Claus Wissig, both of St. Georgen, Fed. Rep. of Germany

[73] Assignee: Gebr. Schmidt Fabrik fuer Feinmechanik, St. Georgen, Fed. Rep. of Germany

[21] Appl. No.: 363,207

[22] Filed: Jun. 8, 1989

[30] Foreign Application Priority Data

Jun. 10, 1988 [DE] Fed. Rep. of Germany ....... 3819759

[51] Int. Cl.$^5$ .............................................. G01D 5/34
[52] U.S. Cl. ................................ 250/231.1; 73/517 R
[58] Field of Search .......... 73/517 R, 517 AV, 517 B, 73/517 A; 250/231.1

[56] References Cited

U.S. PATENT DOCUMENTS 3,778,572 12/1973 Matsui et al. ............... 200/61.45 M
3,798,454 3/1974 Weiss ................................. 73/517 R
4,737,630 4/1988 Andersson ..................... 250/231.1

FOREIGN PATENT DOCUMENTS 3022878 6/1980 Fed. Rep. of Germany .
3402387 1/1984 Fed. Rep. of Germany .
3540947 11/1985 Fed. Rep. of Germany .
3725758 8/1987 Fed. Rep. of Germany .

Primary Examiner—David C. Nelms
Attorney, Agent, or Firm—Harness, Dickey & Pierce

[57] ABSTRACT

An acceleration sensor (10) comprises a light transmitter (21) and a light receiver (37) arranged opposite each other on one optical axis (z). A tilting element (45) of axially symmetrical design, relative to the said axis (z), is arranged coaxially to the said axis (z) in a first operating position. It is provided with a passage opening (47) extending coaxially to the axis (z). Holding means (30, 31) serve for holding the tilting element (45) in a first operating position at a predetermined force in the direction of the axis (z). Guide means (27, 29, 31, 46, 48, 49) permit the tilting element (45), when an acceleration acts upon the tilting element (45), in a direction (x, y) perpendicular to the axis (z), to perform a limited tilting movement against the action of the predetermined force, about a center of rotation arranged at a distance from the axis, into a second operating position. In order to make the acceleration sensor insensitive to accelerations in the direction of the axis (z), the tilting element (45) is designed, as regards its mass distribution in space, in a manner such that the ratio of the breakaway acceleration required for causing the tilting element (45) to be lifted off in the direction of the axis (z) and the tilting acceleration required for causing the tilting element to tilt about its center of rotation is greater than one.

8 Claims, 7 Drawing Sheets

OPTO-ELECTRICAL ACCELERATION SENSOR HAVING A MECHANICAL TILTING ELEMENT

The present invention relates to an acceleration sensor comprising a light transmitter and a light receiver arranged opposite each other on one optical axis, further a tilting element of axially symmetrical design, relative to the said axis, which tilting element is arranged coaxially to the said axis in a first operating position and provided with a passage opening extending coaxially to the axis so that a light beam emitted by the light transmitter passes through the passage opening and is received by the light receiver, further holding means which in a first operating position exert a predetermined force upon the tilting element to hold it in contact with a contact surface, in alignment with the axis, and further guide means which when an acceleration acts upon the tilting element, in a direction perpendicular to the axis, permit the tilting element to perform a limited tilting movement against the action of the predetermined force, about a center of rotation arranged at a distance from the axis, into a second operating position so that the passage opening is moved out of the path of the light beam, the three-dimensional mass distribution of the tilting element and, accordingly, the position of its center of gravity relative to the center of rotation being such that the ratio of the breakaway acceleration required for causing the tilting element to be lifted off in the direction of the axis and the tilting acceleration required for causing the tilting element to tilt about its center of rotation is greater than one.

An acceleration sensor of the type described above has been known already from DE-OS No. 35 40 947.

Acceleration sensors of the type which are of interest for the present purposes are used, for example, in motor vehicles for detecting the condition when predetermined acceleration threshold values are exceeded and for indicating this condition in the form of electric signals. This is of interest in particular for passenger safety systems in motor vehicles where a safety function is triggered when the vehicle hits against an obstacle or is caused by dangerous conditions to perform unusual traveling movements deviating from the normal traveling direction. Such safety functions may, for example, consist in a hazard warning system beginning to flash, the vehicle doors being unlocked centrally, a rollover bar being extended or the fuel supply being interrupted. Sensors intended for such uses, therefore, only have to detect the condition that a predetermined acceleration threshold value is exceeded; but this should be possible—with an all-around characteristic—for all accelerations occurring in a plane parallel to the roadway or having a notable vectorial component in this plane.

It has been known in this connection to use acceleration sensors where a seismic mass is held in a measuring system by a holding force. The holding force on the one hand and the seismic mass on the other hand are sized in such a manner that the force of inertia exerted by the seismic mass exceeds the holding force when a predetermined acceleration threshold value is reached. The seismic mass is then permitted to move a certain distance and to release on this way an electric signal which is then used for activating the safety system. It has been known in this connection to process the signal generated by the sensor with the aid of a processing circuit, for example in order to suppress temporary interference signals.

DE-PS No. 30 22 878 describes an acceleration threshold switch where a spherical inertia body consisting of a ferromagnetic material is retained in its rest position by a permanent magnet. The spherical inertia body is located in a cavity of a sensor and is held in its rest position by the holding force of the permanent magnet as long as the predetermined acceleration threshold value is not exceeded.

In the case of the known sensor, the permanent magnet is supported in a ferromagnetic tubular return pot, and the spherical inertia body is seated in the latter's upper free opening. The upper boundary surface of the cavity, which accommodates the inertia body, consists of a diaphragm. The side of the diaphragm facing away from the cavity carries a switching element.

Now, when the known acceleration sensor is subjected to an acceleration greater than the predetermined threshold value, then the spherical inertia body is lifted off the tubular return pot, against the holding force of the permanent magnet, and is caused to roll in an uncontrolled manner upwardly, along a guide wall forming the lateral boundary surface of the cavity. If the acceleration acting upon the inertia body is sufficiently great, then the inertia body will roll up and against the diaphragm on the opposite side, and the latter will be deflected to actuate the switching element, provided the acceleration is sufficiently great.

The known acceleration sensor, therefore, exhibits the pronounced all-around characteristics desirable for the present application; on the other hand, however, it is connected with quite a number of disadvantages.

In the first line, it is regarded a disadvantage of the known acceleration sensor that the spherical inertia body moves along an undefined path and that, therefore, deviations from the desirable shortest path may be caused by accidental disturbances of the acceleration curve, with the consequence that the spherical inertia body may be caused, for example, to move along a spiral path due to a twisting moment imparted to it. This leads to an undesirable variation of the switching threshold, it being impossible in the case of the known acceleration sensor to define a clear criterion for the acceleration threshold value at which the switching element will (still) be triggered. If, therefore, the risk that dangerous conditions may not be detected is to be excluded in the case of the knwon acceleration sensor, then the switching threshold must be set at a value low enough to ensure that the sensor will respond in any case. On the other hand, however, this leads to undesirable erroneous alarms as in the case of particularly unfavorable acceleration curves even low acceleration values, which are not indicative of a critical condition, may already cause the safety system to be triggered.

It is a further disadvantage of the known acceleration sensor that the system may be triggered also by vertical acceleration forces. This so-called Z sensitivity is particularly undesirable for passenger safety systems in motor vehicles as experience shows that considerable acceleration values in the vertical direction may already occur, for example, when the engine hood or the trunk lid are closed by force, or when the vehicle passes an unevenness, for example a hole or wave in the road or a curbstone, at high speed.

Another disadvantage of the known acceleration sensor is seen in the fact that the switching contact is of the electromechanical type so that its long-term serviceability cannot be ensured in any case under the rough conditions existing on board of a motor vehicle.

Finally, it is a particular risk connected with the electromechanical design of the known sensor that the triggering spherical inertia body may give rise to bouncing phenomena in the switching contact.

The same applies by analogy to the further development of the above known acceleration sensor, as described by DE-PS No. 34 02 387. In the case of this further development, the mechanical contacts are supplemented by a light barrier formed by a horizontally extending bore intersecting the seat of the spherical body. The light barrier is blocked as long as the ball is held on its seat, and released when the ball is lifted off. In addition, this development of the known acceleration sensor comprises ribs which extend along surface lines in the substantially conical space provided for the movement of the spherical body and which serve to prevent spinning movements of the spherical body along the conical surface of the space.

Although these features help achieve a higher degree of reproducibility, the embodiment described by DE-PS No. 34 02 387 is no longer omnidirectional because the ribs allow the spherical body to move practically in only four radial directions extending perpendicularly relative to each other. In addition, the ribs may lead to the condition that the spherical body is caused to perform an oscillating movement below the lower end of the rib, i.e. that it is thrown back and forth between the lower end points of the ribs.

If, in contrast, an acceleration sensor is designed in the manner described by DE-OS No. 35 40 947 mentioned at the outset, then numerous disadvantages of the acceleration sensor according to the prior art can be avoided. For example, the acceleration sensor described by this publication offers the advantage that the guide means permit only a defined tilting movement of the tilting element, and this essentially only in a plane perpendicular to the main axis which coincides with the vertical axis of the motor vehicle, so that the threshold value of the horizontal acceleration, at which the sensor is to respond, can be defined very precisely.

In addition, the use of a light barrier comprising a light transmitter, a light receiver and a switchable transmission element in the form of a passage opening, provides the advantage, in this case too, that no electromechanical switching elements are required at all so that the acceleration sensor described at the outset will remain serviceable even during long-term use on board of a motor vehicle.

Nevertheless, this acceleration sensor described at the outset is also connected with certain disadvantages because it still exhibits a pronounced Z sensitivity. For, the desired tilting movement of the tilting element makes it necessary to arrange the tilting element in the vertical axis at a certain play, as otherwise no tilting movement would be possible. On the other hand, this means, however, that in the case of high acceleration values acting in the vertical direction the tilting element may overcome the holding force, which also acts in the vertical direction, at least momentarily so that even small values of a horizontally directed acceleration encountered at this moment may suffice to move the tilting element into its second operating position. This risk is indeed significant in practice because the real acceleration processes encountered in practical operation of a motor vehicle also give rise to accelerations comprising vectorial components in all directions in space, for example when a motor vehicle hits against a curbstone whereby it is braked in the horizontal direction and is at the same time accelerated downwardly in the vertical direction.

The acceleration sensor known from DE-OS No. 35 40 947 provides that the position of the center of gravity can be adjusted in such a manner that the tilting acceleration can be varied between 0.4 g and 4 g, i.e. that the ratio between the breakaway acceleration in z direction, which is equal to 1 g, and the tilting acceleration may be between 2.5 and 0.25. The range of acceleration ratios is, however, limited due to the fact that in the case of the known acceleration sensor only the force of gravity acts in the z direction, which means that the breakaway acceleration is always equal to 1 g.

When the known acceleration sensor according to DE-OS No. 35 40 947 is used in a motor vehicle, where the axis of the acceleration sensor coincides with the vertical, then the position of the center of gravity of the tilting element on the axis has no influence on the acceleration value in the direction of the axis which is necessary for lifting the tilting element in the direction of this axis. On the other hand, the position of the center of gravity on the axis has a considerable influence on the tilting moment required for causing the tilting element to tilt because the position of the center of gravity on the axis defines the lever arm for the action of the seismic mass of the tilting element relative to the center of rotation. If, therefore, the center of gravity of the tilting element is arranged at a relatively high position, then the desired tilting moment can be achieved already with the aid of a relatively small mass of the tilting element. On the other hand, this also leads to an increase in the breakaway acceleration because the acceleration must rise as the mass is reduced, if a constant holding force is to be overcome. Alternatively, or in addition, the holding force may advantageously be increased without thereby influencing the value of the tilting moment. This means all in all that it is possible to increase considerably the breakaway acceleration in the vertical direction, while keeping the tilting moment constant, so that the before-mentioned erroneous triggering actions caused by tilting movements of the lifted tilting element an be excluded with a high degree of safety.

It is also regarded as a disadvantage of the acceleration sensor known from DE-OS No. 35 40 947 that the tilting behavior at the triggering moment is not sufficiently defined. For, the tilting element rests on the contact surface only by a narrow annular surface which is held by its periphery by means of an insert which surrounds the periphery of the tilting element tightly at its bottom and opens conically towards the top so that the tilting element is permitted to tilt laterally in the resulting conical opening.

This means on the other hand that at the moment of response the tilting element rests on the contact surface only by one point, i.e. exactly that point about which the tilting element is tilted at its periphery and which is located in the plane of the contact surface. It is a disadvantage of this arrangement that under real conditions, when the acceleration components act upon the sensor from different coordinate directions, the tilting element may start spinning, i.e. may be tilted laterally in addition to the primary tilting direction. It will be easily understood that this is detrimental to the desired defined response behavior of the tilting element.

Finally, it has been known from DE-PS No. 37 25 758, a document of earlier priority date though not a prior publication, to design an acceleration sensor of the type described above in such a manner that an annular gap opening radially outwardly and, in addition, a magnetic holder are provided between the contact surface and the bottom face of the tilting element. This arrangement is said to result in a "snapping" effect when the tilting element tilts away laterally, as the annular gap will then open on the one side and close on the opposite side, and due to the underlying physical principles the rise in the force of attraction is greater in the area of the closing annular gap than its decrease in the area of the opening annular gap.

However, this aceleration sensor also does not exhibit the desired sufficiently defined tilting behavior at the moment of response since the tilting element initially rests on the contact surface only by one point, i.e. by one point of its periphery at the transition between a central, plane contact area and the radially opening annular gap.

Now, it is the object of the present invention to improve a sensor of the type described above in such a manner that its Z sensitivity is further reduced and an exactly defined switching behavior and, accordingly, safe and reliable triggering of the sensor is achieved so that the risk of erroneous triggering can be reduced still further.

This object is achieved according to the invention by the fact that the tilting element is provided with a radially projecting collar whose peripheral edge constituting the location of the center of rotation is spaced vertically from the contact surface and that the tilting element consists of a ferromagnetic material and the holding means comprises a magnet with axial magnetization on which the tilting element is supported in its first operating position.

These features offer the advantage that—in the first line—the tilting behavior at the triggering moment is much better defined because the tilting element rotates about a center of rotation arranged vertically above the contact surface. For, the tilting moment is determined in this case exclusively by the vertical spacing between the center of gravity and the center of rotation which is defined, in the case of a horizontally acting acceleration, by the point of contact of the tilting element and is, consequently, responsible for the beginning of the tilting movement. When the tilting movement commences, the tilting element is then guided by two points, i.e. on the one hand by the before-mentioned center of rotation, which now moves downwardly along the surrounding housing wall, while on the other hand a peripheral point of the contact surface of the tilting element moves radially inwardly. This arrangement, namely that the tilting element is guided during its tilting movement by two points arranged in one vertical plane, ensures advantageously that the tilting element is permitted to tilt only in this vertical plane and cannot possibly escape laterally.

In addition, the fact that the tilting element is retained magnetically—a feature which is known as such—provides the advantage that the vertical retaining force can be adjusted within wide limits so that the breakaway acceleration in the z direction is not limited by the natural force of gravity.

According to a preferred embodiment of the acceleration sensor of the invention, where the tilting element is provided with an approximately cylindrical head, which is followed in downward direction by the radially projecting collar, and where an additional recessed area is provided at the bottom of the tilting element, the head is preferably given a tapering design below the center of gravity.

This feature provides the advantage that the desired raised position of the center of gravity, relative to the center of rotation, can be achieved by extending the recessed portion far upwardly into the tilting element. Extending the recessed portion right to the axial position of the center of gravity provides the advantage that one obtains in this manner an optimum position of the center of gravity, in combination with a limited overall height of the tilting element. By extending the recessed portion excessively far to the top, one would reduce the mass of the tilting element above the recessed portion, relative to the mass encountered at the foot of the tilting element and the boundary walls of the recessed portion, so that if the recessed portion were extended still further to the top the position of the center of gravity would finally be displaced in the reverse sense, i.e. in downward direction. The proposed feature achieves an optimum in this respect.

According to another preferred improvement of the embodiment described before, the collar is provided with a hollow portion extending all around its circumference.

This feature also provides the advantage that the share of the mass encountered at the foot of the tilting element is further reduced so that the position of the center of gravity is raised still further in the axial direction.

According to another preferred embodiment, a non-magnetic washer of a predetermined thickness is arranged between the tilting element and the magnet.

This feature provides initially the advantage that the washer may provide a support for the foot of the tilting element. For, it is a characteristic of usual magnets of the type relevant in the present case, in particular of ferrites, that their surface is relatively rough so that the adhesive behavior between the tilting element and the magnet cannot be adjusted in an exactly reproducible manner, the adhesive behavior being dependent on the exact contact point between the tilting element and the uneven surface, for example of the ferrite.

By providing a non-magnetic washer between the tilting element and the magnet one further gains the additional advantage that the interrelation between the retaining force and the thickness of the washer gets less critical as the thickness of the washer rises. Although the absolute amount of the retaining force is also reduced in this manner, this fact can be compensated easily, for the magnet sizes relevant in the present case, by appropriate selection of the magnets to be used. For the reasons outlined above, the relatively large air gap formed by the non-magnetic washer provides, however, the advantage that production tolerances regarding the thickness of the washer are uncritical.

Other advantages of the invention will appear from the specification and the attached drawing.

It is understood that the features that have been described before and will be explained hereafter may be used not only in the described combinations, but also in any other combination, or individually, without leaving the scope and intent of the present invention.

Certain embodiments of the invention will now be described in more detail with reference to the drawing in which.

Figure 1:
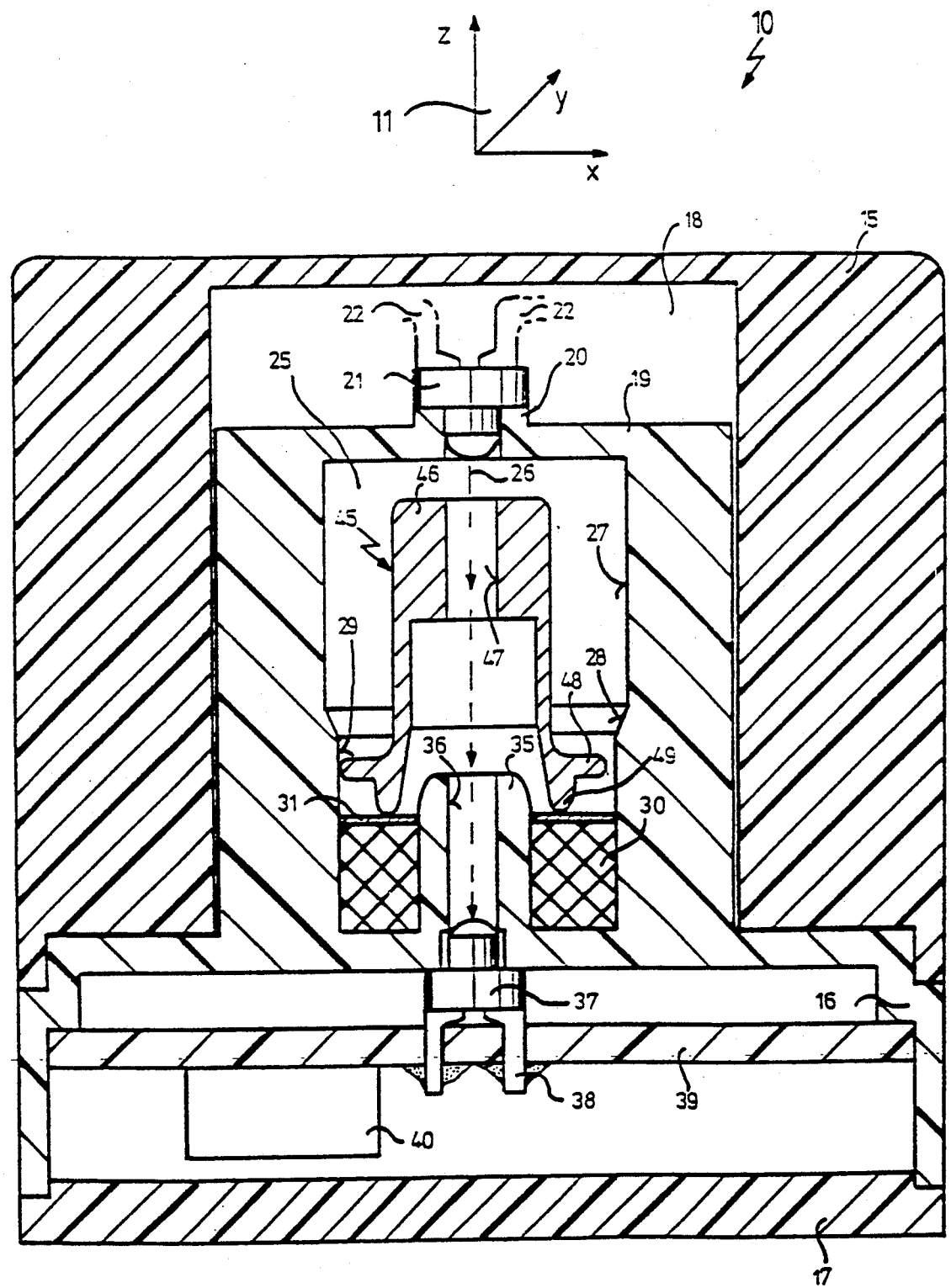
FIG. 1 shows a diagrammatic cross-sectional representation of one embodiment of the acceleration sensor according to the invention, where the tilting element occupies its first operating position, namely its rest position.
Figure 2:
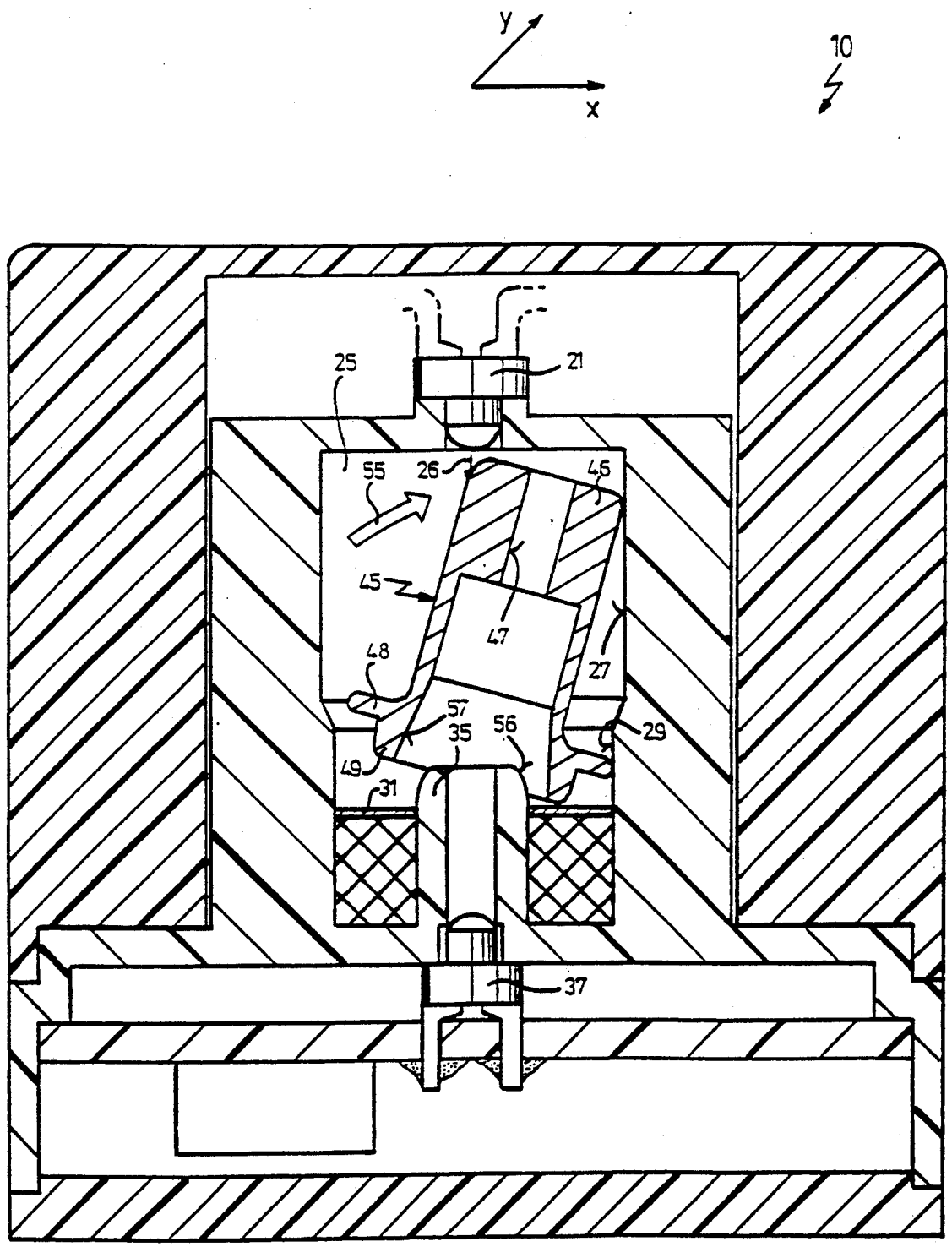
FIG. 2 shows a representation similar to that of FIG. 1, but with the tilting element in the second operating position corresponding to the condition where a predetermined acceleration threshold value has been exceeded in the horizontal plane.

In FIGS. 1 and 2, an acceleration sensor of the type used for passive passenger safety systems in motor vehicles is designated generally by reference numeral 10. A coordinate system 11 describes the installed position of the acceleration sensor 10. It results from this illustration that the main axis of the acceleration sensor 10 extends in the direction of the z axis of the coordinate system 11, which corresponds to the vertical. The acceleration sensor 10 is intended to detect and indicate those acceleration threshold values whose essential component extends in the horizontal plane, i.e. in the x/y plane of the coordinate system 11.

The acceleration sensor 10 comprises a cap 15, a mounting part 16 and a bottom 17. These components are, preferably, injection molded from a plastic material and can be inserted into and fixed to each other in the axial direction.

The cap 15 encloses a first cavity 18 accommodating a first cylindrical extension 19 of the mounting part 16 which projects into the cavity 18 in the z direction. The first cylindrical extension 19 carries on its upside a centric mounting part 20 for a light transmitter, preferably a light-emitting diode (LED) 21. The light-emitting diode 21 is provided, in the conventional manner, with connections 22 and is arranged in such a manner that its light-emitting side is directed vertically downwardly into a second cavity 25 which is enclosed by the first cylindrical extension 19. The light-emitting diode 21 emits a light beam 26 in the z direction.

The second cavity 25 is provided in its upper area with a first cylindrical wall 27 which is followed at the bottom by a conical wall 28 ending at its bottom in a second cylindrical wall 29 of smaller diameter. The second cylindrical wall 29 forms the walling of a blind bore accommodating a toroidal permanent magnet 30. The permanent magnet 30 is magnetized in the direction of the z axis and is covered on top by a washer 31 of predetermined thickness.

A second cylindrical extension 35 of the mounting part 16 extends through the central opening of the toroidal permanent magnet 30. The second cylindrical extension 35 is provided with an axial bore 36. The bottom of the mounting part 16 carries photosensitive elements 37, for example a photo transistor or a photo diode. Connections 38 of the photosensitive element 37 connect the latter to a circuit board 39 which is inserted into the mounting part 16 from below. The circuit board 39 carries additional electronic components 40, such as supply, amplifier or evaluation units for the light-emitting diode 21 and the photosensitive element 37, and for the signals emitted by the latter.

In the second cavity 25, one can see a tilting cone—generally designated by reference numeral 45—of axially symmetrical design, which is supported by the washer 31.

The upper portion of the tilting cone 45 consists of a solid head 46, passed merely by a central bore 47. The tilting cone 45 ends at its bottom in a collar 48 and, finally, a foot 49, both of them extending all around its periphery.

The diameter of the collar 48 is adapted to the inner diameter of the second cylindrical wall 29 so that the tilting cone 45 is permitted to move in the horizontal plane only with very little play.

Due to the action of the permanent magnet 30, the tilting cone 45 is retained on the washer 31 by an adhesion force acting downwardly in the z direction, as will be explained in more detail in connection with FIG. 3. The tilting cone 45 is aligned coaxially relative to the z axis, being centered in the second cylindrical wall 29 by the collar 48. The light beam 26 emitted by the light-emitting diode 21, therefore, passes the bores 47 and 36 and is received by the photosensitive element 37. The positive output signal of the photosensitive element 37 is interpreted, with the aid of the electric component 40, as the tilting cone 45 occupying its rest position or its first operating position.

Now, when an acceleration having a notable component in the x/y plane of the coordinate system 11, is exerted upon the acceleration 10, this horizontally directed acceleration comes to act upon the tilting cone 45 which has its center of gravity located at a point relatively far above the washer 31, due to its solid head 46. Once a predetermined acceleration threshold value is exceeded, the tilting cone 45 will tilt laterally due to the fact that the tilting moment acting on it is high enough to overcome the adhesion force exerted by the permanent magnet 30. The tilting movement is performed about the edge of the collar 48 which acts in this case as center of rotation.

FIG. 2 illustrates this tilting movement. It has been assumed for the purposes of this illustration that the acceleration has its maximum value in the x direction. Arrow 55 indicates the tilting movement of the cone 45.

During its tilting movement, the tilting cone 45 moves in a guided manner, the collar 48 of the tilting cone 45 being supported, by a point of rotation located at the right side of its circular edge, on the second cylindrical wall 29 of the second cavity 25, as viewed in FIG. 2.

An additional improvement of the guide means for the tilting cone 45 during the tilting movement can be achieved by giving the outside of the second cylindrical extension 35 and the inside of the foot 49 of the tilting cone 45 configurations 56, 57 which complement each other so that the foot 49 of the tilting cone 45 is guided by the second cylindrical extension 35 during its tilting movement in the manner of a cam guide.

Figure 3:
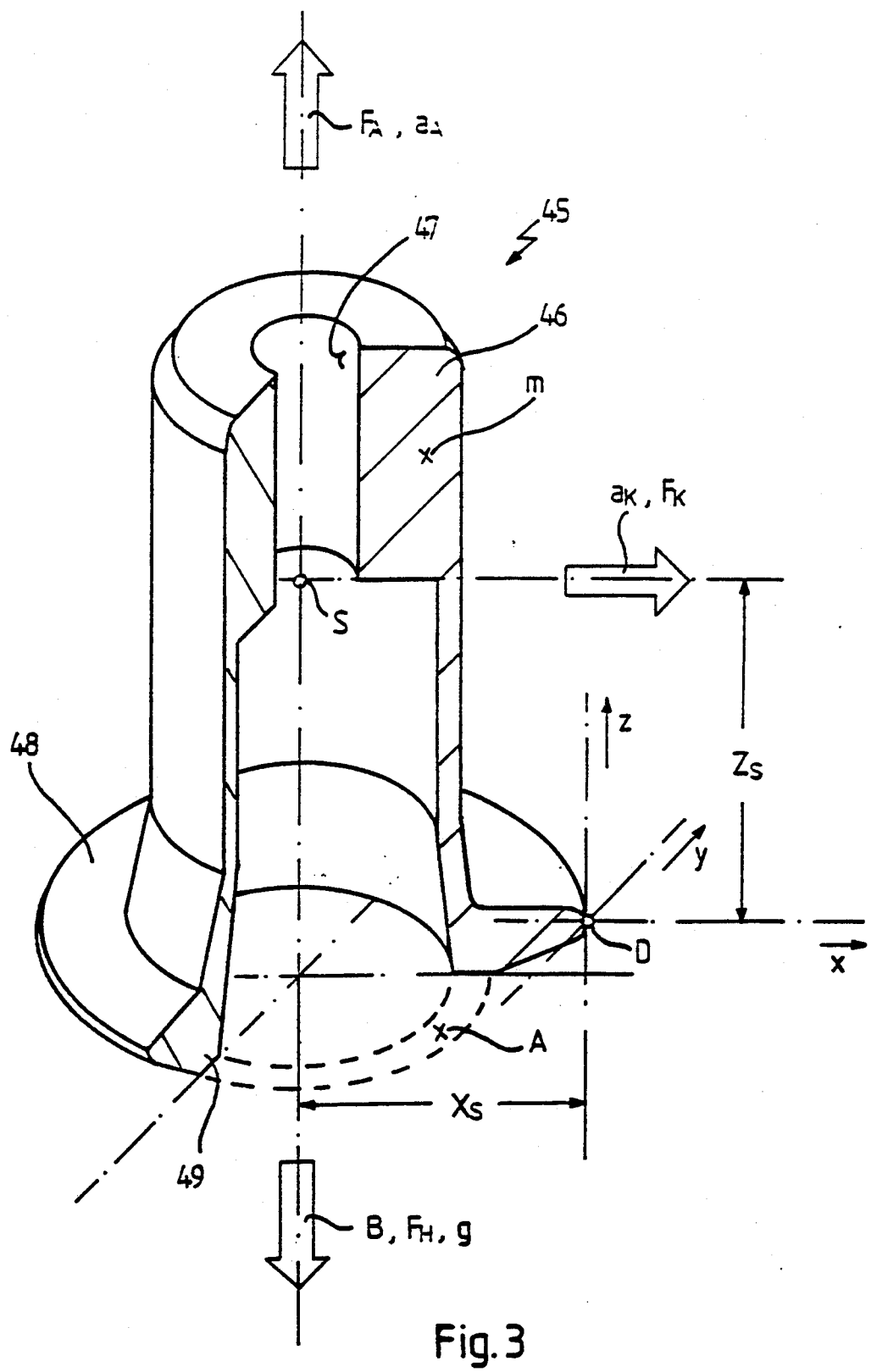
FIG. 3 shows a perspective representation of a tilting element illustrating the operation of the acceleration sensor according to the invention.

FIG. 3 shows a perspective view of the tilting cone 45, partly broken away, illustrating the physical phenomena acting during operation.

It has been explained before that during its tilting movement the tilting cone 45 turns about a center of rotation D located on the outer edge of its collar 48. One can now draw the coordinate system x/y/z through this center of rotation D and define the coordinates of the center of gravity S of the tilting cone 45 by $x_s$ and $z_s$. If the tilting cone 45, which consists of a ferromagnetic material, is seated on the permanent magnet 30, whose flux density is designated by B, and if the contact surface of the foot 59 is designated by A, then the following applies:

The adhesion $F_H$ by which the tilting cone 45 is retained in contact with the permanent magnet 30, can be defined by the following formula:

$$F_H = AB^2 \text{const}$$

If one further considers the gravitational acceleration g acting on the tilting cone 45 with the mass m, then the breakaway force $F_A$ which must be exerted in order to lift the tilting cone 45 off the permanent magnet 30 upwardly, in z direction, can be defined by the formula $$F_A = F_H + mg = ma_A$$

wherein $a_A$ is the breakaway acceleration.

As regards the tilting force $F_K$ that must be applied in order to tilt the tilting cone 45 laterally, the following formula applies:

$$F_K = ma_K$$

wherein $a_K$ is the tilting acceleration, i.e. the threshold value of the horizontal acceleration relevant in the present context.

The tilting moment $M_K$ then can be defined as $$M_K = F_K z_s$$

and the breakaway moment $M_A$ can be defined correspondingly as $$M_A = (F_H + mg) x_s,$$

wherein the tilting moment $M_K$ and the breakaway moment $M_A$ are related to the center of rotation D.

The tilting condition is fulfilled when $$M_K = M_A$$

which means, by conclusion, that $$a_A / a_K = z_s / x_s.$$

The quotient of breakaway acceleration $a_A$ and tilting acceleration $a_K$ is, therefore, equal to the quotient of the coordinates $z_s$ and $x_s$ of the center of gravity S, relative to the center of rotation D. To say it in other words, this means that for a given diameter of the tilting cone and, accordingly, a constant value of $x_s$, and a likewise given acceleration threshold value in the horizontal plane, i.e. a constant value of $a_K$, the breakaway acceleration $a_A$ will increase in the desired manner as $z_s$ increases, i.e. as the vertical position of the center of gravity S is displaced upwardly.

Figure 4:
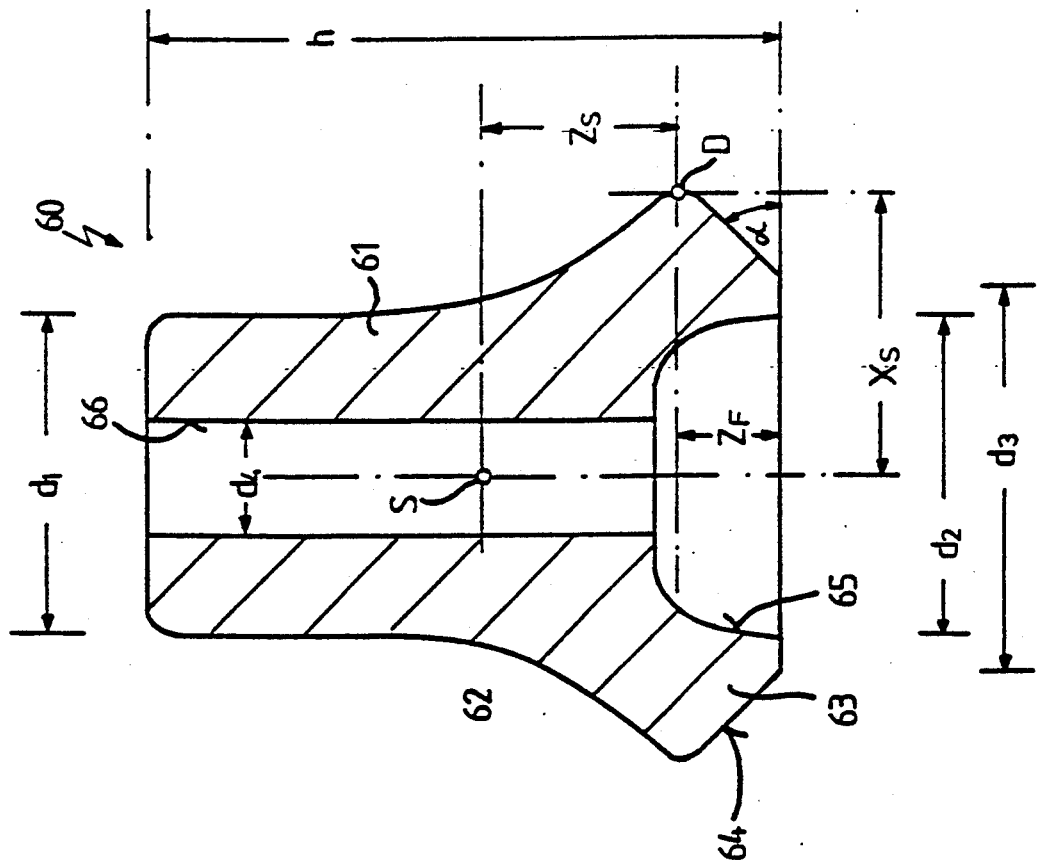
FIG. 4 shows a vertical section through a tilting element.

FIG. 4 shows a tilting cone 60 whose head consists substantially of a continuous cylindrical section 61 ending at its bottom in a hyperboloid of revolution 62. A foot 63 is formed by a conical surface 64 extending in opposite direction to the hyperboloid of revolution 62. A rounded recessed portion 65 is worked into the bottom of the tilting cone 60. The tilting cone 60 is provided with a bore 66 extending over its full axial height h.

In a practical example of a tilting cone 60 the axial height h is approximately equal to 10 mm, the overall diameter, i.e. twice the value of $x_s$, is equal to approx. 8.8 mm, the diameter $d_1$ of the cylindrical section 61 is equal to approx. 5 mm, the diameter $d_2$ of the rounded recessed portion 65 to approx. 5 mm, the outer diameter $d_3$ of the foot 63 to approx. 6 mm and the inner diameter $d_4$ of the bore 66 to approx. 1.8 mm. The means height $z_F$ of the center of rotation D above the bottom of the foot 63 is equal to approx. 2 mm. The distance $z_s$ between the center of gravity S from the center of rotation D, measured along the z axis, is approx. 3.2 mm. The angle of inclination $\beta$ of the conical surface 64 amounts to approx. 45°, while the rounded recessed portion 65 exhibits a maximum angle of inclination equal to approx. 10°.

The tilting cone 60 consists of soft iron. It may be arranged, for example, on a permanent magnet consisting of a hard ferrite known under the type designation of HF 8/22, being axially magnetized and having an outer diameter of 8.8 mm, an inner diameter of 4 mm and a height of 2.25 mm. It is possible with the aid of such a magnetic clamp to achieve flux densities of 200 mT. With a thickness of the washer 31 in the range of 0.5 to 1.0 mm, one achieves in this manner adhesion forces $F_H$ in the range of 4 p (0.04N).

The ratio between the breakaway acceleration $a_A$ and the tilting acceleration $a_K$ derived from the above dimensions of the tilting cone 60, which corresponds to the ratio between the coordinates $z_s/x_s$, is as small as approx. 0.73. This means that the tilting cone 60 will break away from the permanent magnet 30 already under the action of a vertical acceleration amounting to only 0.73 times the acceleration threshold value in the horizontal plane.

In order to avoid this disadvantage, the tilting cone may be improved by raising the axial position of the center of gravity S, as will be described in greater detail below, with reference to FIGS. 5 to 9.

Figure 5:
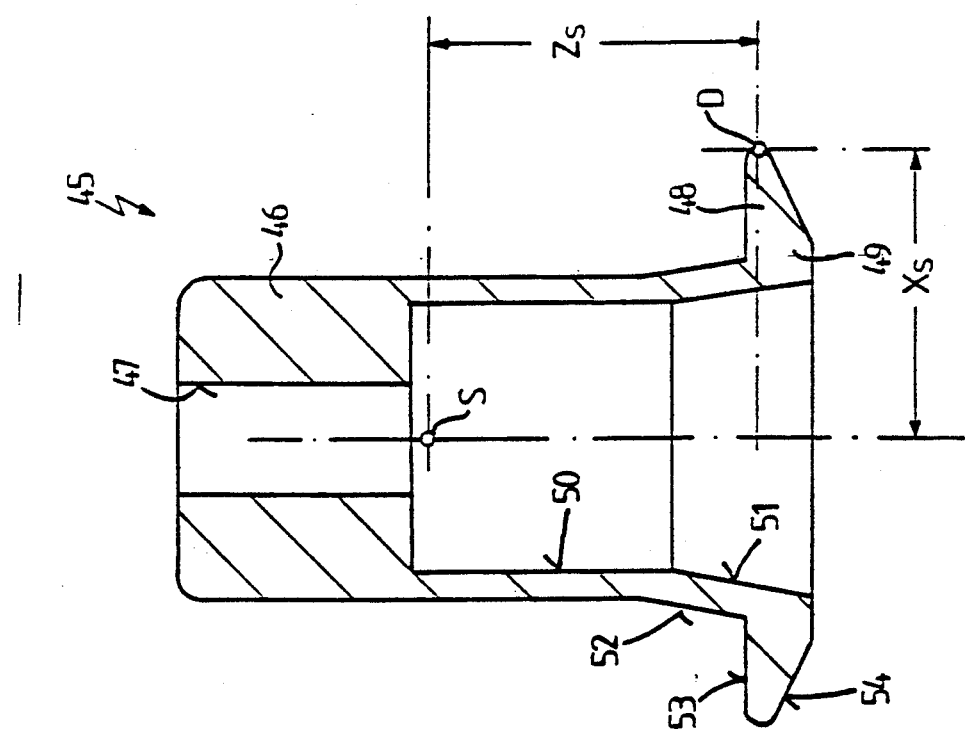
FIGS. 5, 6, 7, 8 and 9 show vertical sections through five embodiments of tilting elements according to the invention.

FIG. 5 shows a first embodiment of a tilting cone 45 which conforms substantially to the tilting cone of FIGS. 1 to 3.

It is clearly visible in FIG. 5 that the tilting cone 45 comprises a lower cylindrical recessed portion 50 ending at its bottom in a conical portion 51. Correspondingly, the outer wall 52 of the tilting cone 45 is also designed conically. It is followed at its lower end by a plane radial surface 53 of the collar 48. The bottom face of the collar 48 also exhibits a conical surface 54, at the transition to the foot 49.

In the second operating position of the tilting cone 45 (see FIG. 2) the conical surface 54 may provoke a snapping effect at the moment when the tilting angle of the tilting cone 45 is just as big as the angle of inclination of the conical surface 54. The tilting cone 45, being in its second operating position as illustrated in FIG. 2, is supported at this moment by a surface line of the conical surface 54 so that a relatively high adhesion force is obtained in this second operating position and the tilting cone 45 will be locked in this position until a restoring moment is exerted on it.

It can be clearly seen in FIG. 5 that the tilting cone 45 is given a hollow design in its lower portion so that its center of gravity S is located at a point clearly higher than in the case of the tilting cone 60 shown in FIG. 4. It has been found in practice that by extending the cylindrical recessed portion 50 upwardly in the direction of the z axis a maximum height of the center of gravity S is obtained when the center of gravity S coincides approximately with the upper end of the cylindrical recessed portion 50. If the cylindrical recessed portion 50 is extended still further in upward direction, the center of gravity S will start to move downward as the mass components of the foot of the tilting cone 45 will then gain more and more importance, compared to the remaining mass in the area of the head 46, assuming a finite overall height h.

The embodiment illustrated in FIG. 5 leads to an acceleration quotient of, for example, 1.13. For easier comparison, the scale selected for the illustrations of FIGS. 5 to 9 is identical to that of FIG. 4, and the dimensions h, $x_s$, $d_1$ and $d_4$ have been assumed to be constant.

Figure 6:
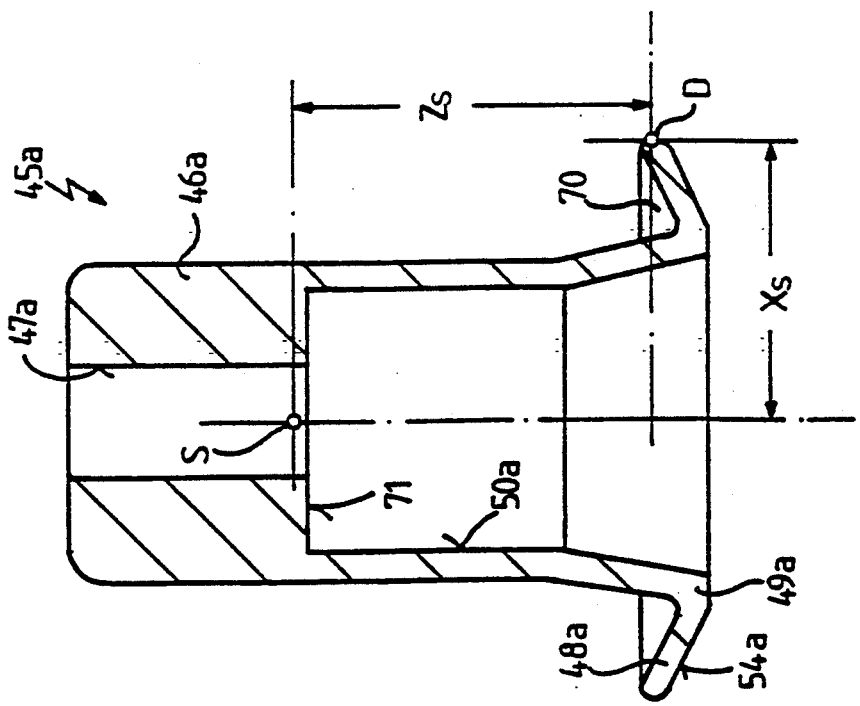

In the case of the variant illustrated in FIG. 6, the design of the tilting cone 45a corresponds to that of the tilting cone 45, except that the plane surface 53 in the area of the collar 48 has now been replaced by a recessed portion 70 in the area of the collar 48a in order to reduce the mass components in the area of the foot of the cone 45. With otherwise unchanged dimensions, this design leads to a higher location of the center of gravity S, and this again increases the acceleration quotient to a value of approx. 1.22.

In the case of the variant illustrated in FIG. 7, the tilting cone 45b is recessed radially at a point below the center of gravity S and exhibits in this area a conical portion ending again in a collar 48b and a foot 49b, corresponding to the respective elements in FIG. 5. This design according to FIG. 7, comprising a conical portion 75 and a conical recessed portion 76, leads to an acceleration quotient of approx. 1.13.

Figure 8:
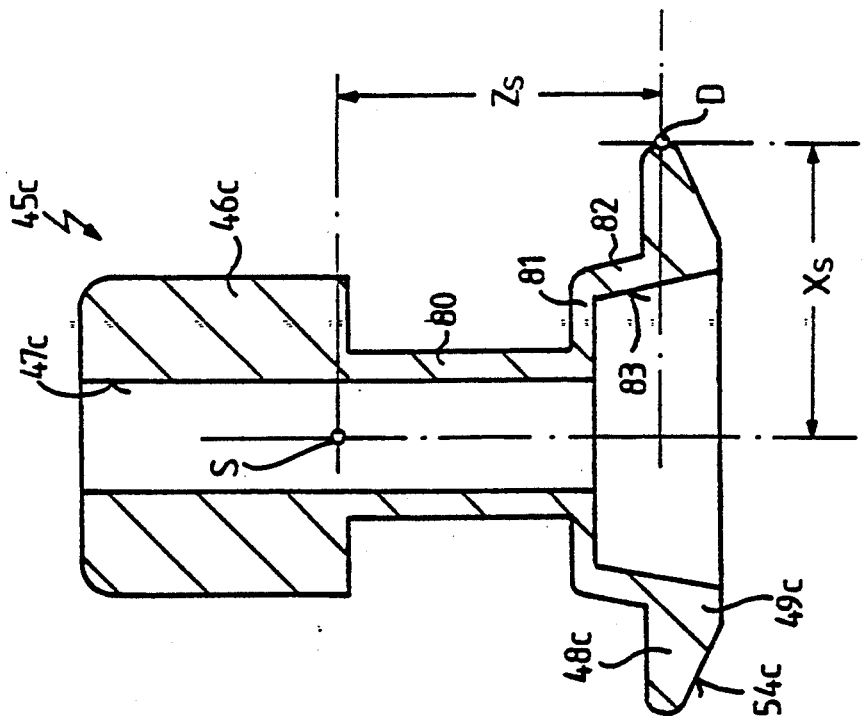

In the case of the embodiment shown in FIG. 8, the tilting cone 45c is again recessed axially at a point below the center of gravity S, but in this case the narrower portion is designed as a cylindrical portion 80 of smaller diameter, followed at its bottom at first by a radial shoulder 81 and then by a conical portion 82. The recessed portion 83 has the shape of a truncated cone.

The acceleration quotient of this embodiment is equal to approx. 1.16.

Figure 7:
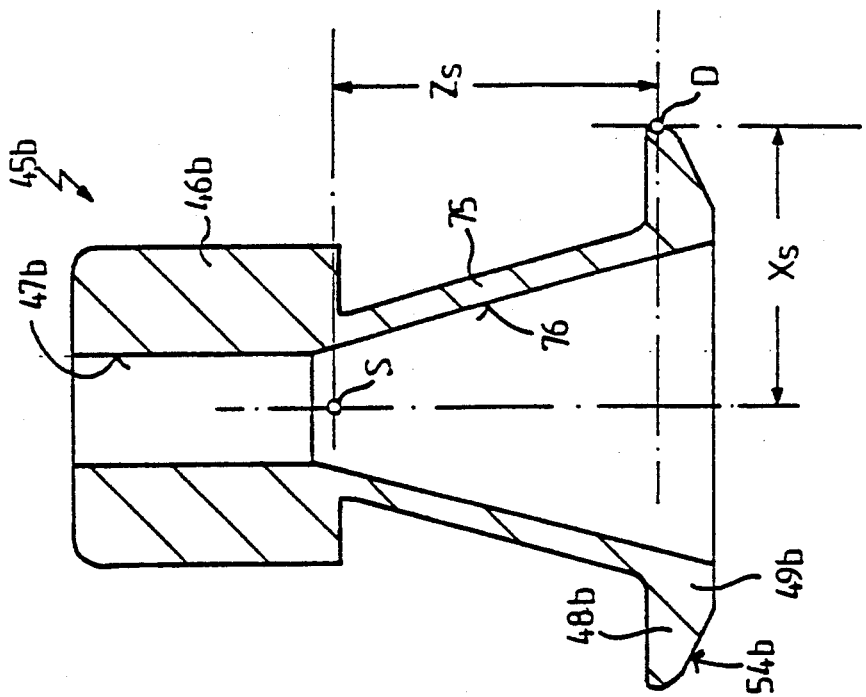
Figure 9:
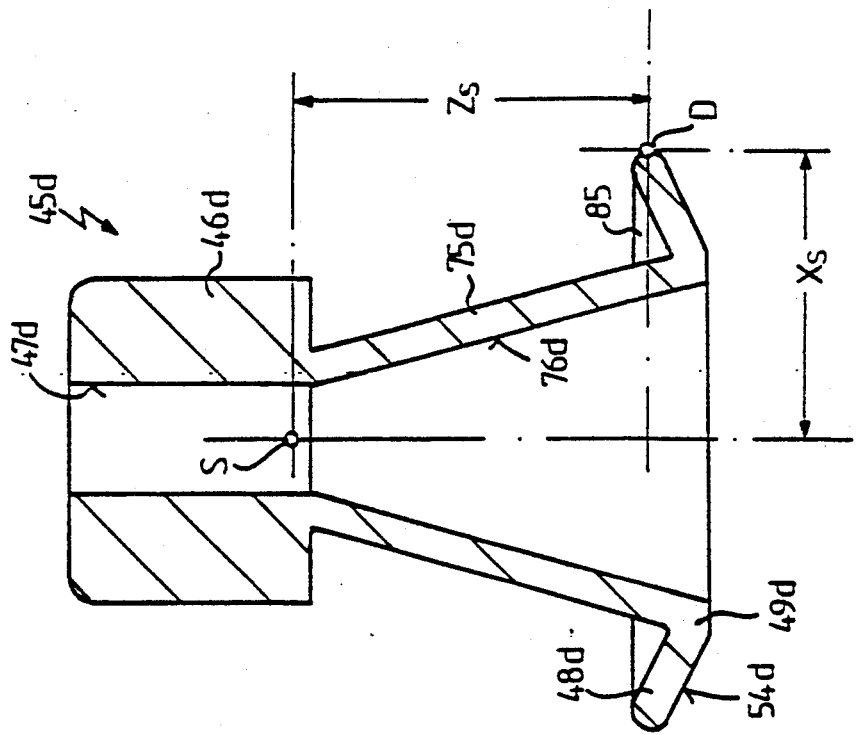

FIG. 9 finally shows another variant of a tilting cone 45d corresponding largely to the variant of FIG. 7, except that the area of the collar 48d is again provided with a hollow portion 85 in order to reduce the mass component in the area of the foot of the tilting cone 45d.

The embodiment illustrated in FIG. 9 leads, for example, to an acceleration quotient of 1.26.

In conclusion, the above means that if for practical passive passenger safety systems a desired horizontal acceleration threshold value of, for example, 4 g is desired, the breakaway acceleration $a_A$ of the acceleration sensors according to the invention using tilting cones according to FIGS. 5 to 9 may be in the range of 5 g, whereas the embodiment of the tilting cone according to FIG. 4 would result in a breakaway acceleration $a_A$ of only 3 g. However, this increase in the breakaway acceleration $a_A$ from 3 g to 5 g can be considered a substantial improvement of the performance data of the acceleration sensor 10 according to the invention.

Figure 10:
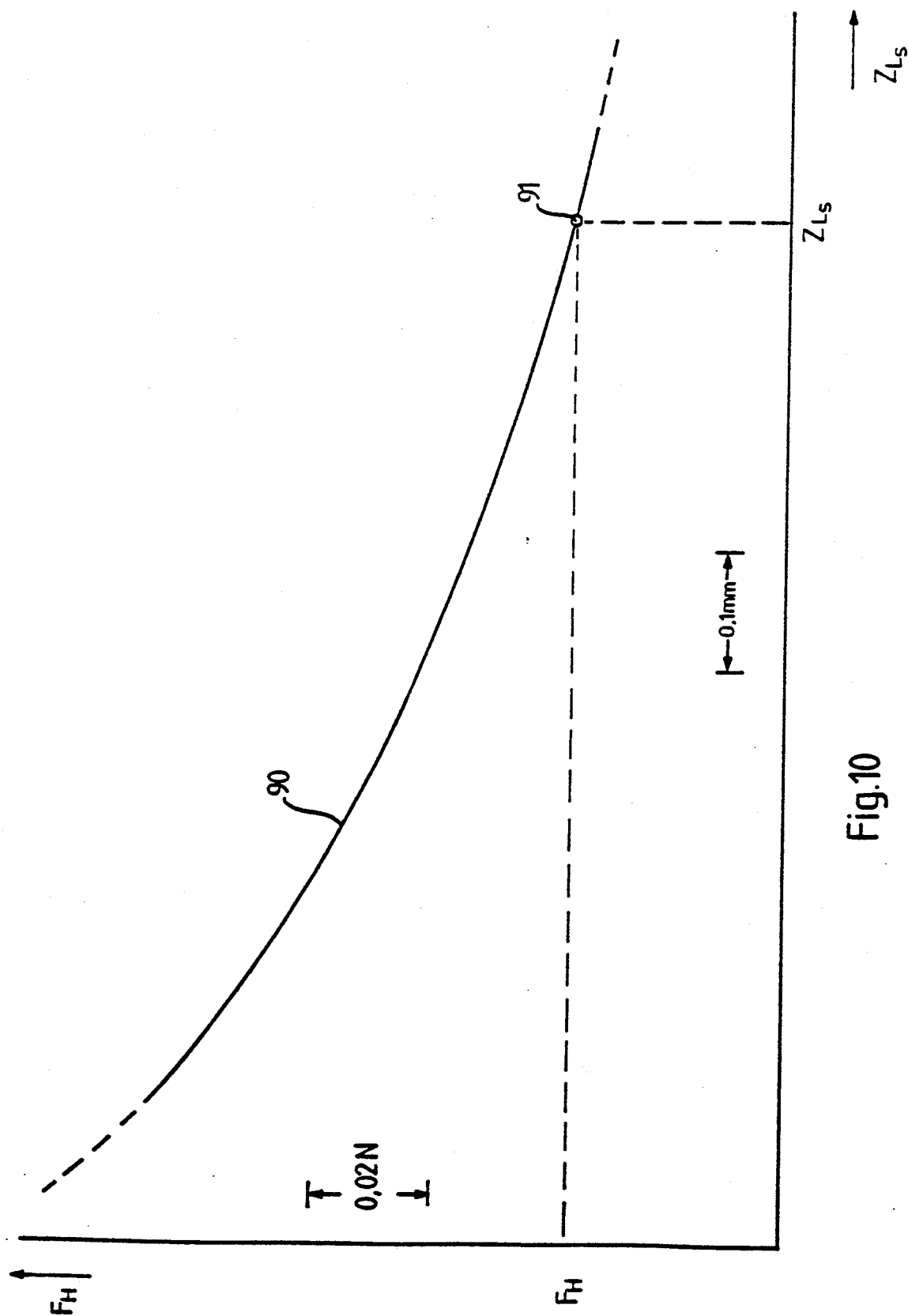
FIG. 10 shows a diagram illustrating the interrelation between the retaining force and the width of the air gap in an acceleration sensor according to the invention.

Finally, FIG. 10 illustrates the adhesion $F_H$ as a function of the air gap width $z_{LS}$ produced by the washer 31.

The curve 90 shows the known hyperbolic shape; the adhesion $F_H$ decreases as the air gap width $z_{LS}$ is increased.

With the axes assigned the parameters in the manner of FIG. 10, a working point 91 may be selected within the flat portion of the curve 90, where the dependence of the adhesion $F_H$ on any variations of the air gap width $z_{LS}$ is uncritical. For example, the air gap width $z_{LS}$ may be adjusted to a value between 0.8 to 0.9 mm in order to obtain an adhesion $F_H$ of between 3 and 4 p (0.03 to 0.04N). These values relate to the example described above comprising an annular magnet of a hard ferrite with a non-magnetic washer and a tilting cone made from soft iron.

What is claimed is:

1. An acceleration sensor comprising:
   a light emitting element for emitting a beam of light along a vertical first axis;
   a light receiving element arranged at a distance from said light emitting element and positioned for receiving said beam of light and for generating an electrical signal when said beam of light impinges on said light receiving element;
   a tilting element arranged between said light emitting element and said light receiving element, and being of axially symmetrical design with respect to a second axis, and being provided with a bore along said second axis, said tilting element having a horizontal bottom surface, and having a radially projecting collar arranged at a distance above said bottom surface, said collar having a peripheral edge constituting a location for a center of tilting movement of said tilting element between a first operational position with said axis arranged substantially coaxial with said first axis to enable said beam of light to pass through said bore and impinge on said light receiving element and a second operational position with said second axis being tilted relative to said first axis to interrupt said beam of light and prevent same from impinging on said light receiving element, said tilting element being designed with a three-dimensional mass distribution and, hence, an axial position of its center of gravity such that the quotient of a lift-off acceleration acting on said tilting element in said first operational position when sufficiently high to lift said tilting element off against gravity along said first axis divided by a tilting acceleration acting on said tilting element in a direction perpendicular to said first axis when sufficiently high to tilt said tilting element about said center of tilting movement, is greater than unity;
   guide means arranged around said tilting element and having a horizontal first support surface extending generally perpendicularly to said first axis for receiving said bottom surface and having a cylindrical second support surface extending generally coaxially with said first axis and surrounding said collar with radial spacing to allow said collar to bear against said second support surface when said tilting element tilts from said first operational position into said second operational position in a limited tilting movement;
   magnetic holding means being axially polarized and acting between said bottom surface and said first support surface to exert a vertically directed holding force on said tilting element.

2. The acceleration sensor of claim 1, wherein said tilting element is provided with an approximately cylindrical head, arranged axially above said radially projecting collar, said head being reduced in diameter below said center of gravity.

3. The acceleration sensor of claim 1, wherein said collar is provided with a circumferential hollow portion.

4. The acceleration sensor of claim 1, comprising a non-magnetic washer of a predetermined thickness being arranged between said bottom surface and said first support surface.

5. An acceleration sensor comprising:
a light emitting element for emitting a beam of light along a vertical first axis;
a light receiving element arranged at a distance from said light emitting element and positioned for receiving said beam of light and for generating an electrical signal when said beam of light impinges on said light receiving element;
a tilting element arranged between said light emitting element and said light receiving element, and being of axially symmetrical design with respect to a second axis, and being provided with a bore along said second axis, said tilting element having a horizontal bottom surface, and having a radially projecting collar arranged at a distance above said bottom surface, said collar having a peripheral edge constituting a location for a center of tilting movement of said tilting element between a first operational position with said axis arranged substantially coaxial with said first axis to enable said beam of light to pass through said bore and impinge on said light receiving element and a second operational position with said second axis being tilted relative to said first axis to interrupt said beam of light and prevent same from impinging on said light receiving element, said tilting element being designed with a three-dimensional mass distribution and, hence, an axial position of its center of gravity such that the axial distance along said second axis between said center of gravity and said center of tilting movement is greater than the radial distance from said second axis to said center of tilting movement;
guide means arranged around said tilting element and having a horizontal first support surface extending generally perpendicularly to said first axis for receiving said bottom surface and having a cylindrical second support surface extending generally coaxially with said first axis and surrounding said collar with radial spacing to allow said collar to bear against said second support surface when said tilting element tilts from said first operational position into said second operational position in a limited tilting movement;
magnetic holding means being axially polarized and acting between said bottom surface and said first support surface to exert a vertically directed holding force on said tilting element.

6. The acceleration sensor of claim 5, wherein said tilting element is provided with an approximately cylindrical head, arranged axially above said radially projecting collar, said head being reduced in diameter below said center of gravity.

7. The acceleration sensor of claim 5, wherein said collar is provided with a circumferential recessed portion.

8. The acceleration sensor of claim 5, comprising a non-magnetic washer of a predetermined thickness being arranged between said bottom surface and said first support surface.

* * * * *